Figure 1:
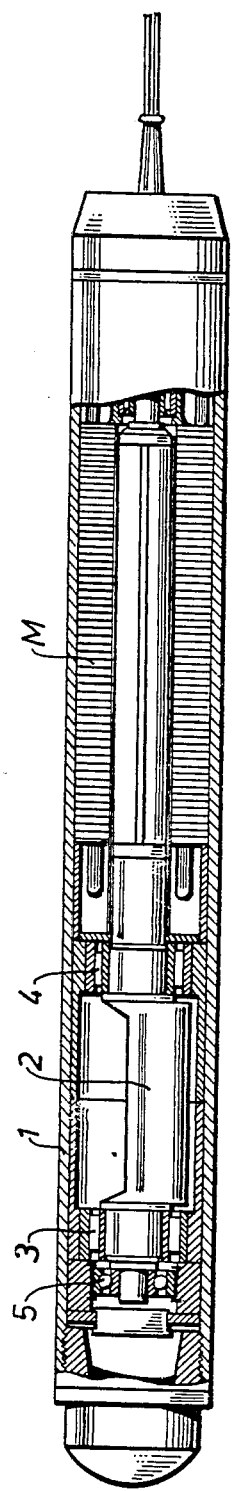

United States Patent [19]

Marie

[11] Patent Number: 4,848,936

[45] Date of Patent: Jul. 18, 1989

[54] BEARING DEVICE FOR POKER VIBRATOR

[75] Inventor: Bataille J. Marie, Saint-Valery-en-Caux, France

[73] Assignee: Dynapac, Sweden

[21] Appl. No.: 804,230

[22] Filed: Dec. 3, 1985

Related U.S. Application Data

[63] Continuation of Ser. No. 466,349, Feb. 7, 1983, abandoned.

[30] Foreign Application Priority Data

Jun. 11, 1982 [SE] Sweden ............... SE 82/00206

[51] Int. Cl.⁴ ............................................. F16C 19/14
[52] U.S. Cl. ................................................... 384/454
[58] Field of Search ............... 128/32, 34, 36; 73/66 n, 66 nl; 384/452, 494, 609, 618, 619

[56] References Cited

U.S. PATENT DOCUMENTS

| | | | |
|---|---|---|---|
| 3,070,412 | 12/1962 | Dorl | 308/174 |
| 3,131,006 | 4/1964 | Anderson | 308/174 |
| 3,214,224 | 10/1965 | Lash | 308/176 |
| 3,391,966 | 7/1968 | Chapman | 308/187 |
| 3,416,848 | 12/1968 | Recknagel | 308/174 |
| 3,494,353 | 2/1970 | Marich | 128/36 |
| 3,628,836 | 12/1971 | Mulready et al. | 308/184 R |
| 4,175,803 | 11/1979 | Roberts | 308/184 R X |
| 4,224,932 | 9/1980 | Farb | 128/36 |
| 4,337,983 | 7/1982 | Hibner | 308/173 |

FOREIGN PATENT DOCUMENTS 1400940 8/1969 Fed. Rep. of Germany .

388123 9/1976 Sweden .

OTHER PUBLICATIONS

Dynapac Spare Parts Catalogue AL 31-41-51-61, Aug. 1977.
Dynapac Poker Vibrators AL 31-41-51-61.
"High Frequency Poker Vibrators", Dynapac AT, Mar. 1983.
Pokers, Poker Vibrators from Dynapac.
"Range of Concrete Equipment", Dynapac.

Primary Examiner—David Werner
Attorney, Agent, or Firm—Brumbaugh, Graves, Donohue & Raymond

[57] ABSTRACT

The present invention relates to a bearing device particularly intended to be used in the type of poker vibrator whose rotor shaft (2) exhibits an eccentric arranged between two needle roller bearings (3,4). Besides being carried in these bearings, the rotor shaft (2) is also carried in a deep-groove ball bearing (5) intended to take up any axial forces acting on the rotor shaft. In order to relieve it from radial forces, the deep-groove bearings (5) is mounted in accordance with this invention with a positive clearance in both the radial and axial directions. The radial clearance can thereby be provided either between the deep-groove ball bearing's outer race (6) and the bearing sleeve (7) or between its inner race (8) and the rotor shaft (2). The purpose of the axial clearance is to permit the radial movement of the deep-groove ball bearing (5) that is the purpose of the radial clearance.

3 Claims, 1 Drawing Sheet

U.S. Patent   Jul. 18, 1989   4,848,936

BEARING DEVICE FOR POKER VIBRATOR

This application is a continuation of application Ser. No. 466,349 filed on Feb. 7, 1983, now abandoned.

The present invention relates to a bearing device for the type of poker vibrator which is brought to vibrate by means of a rotor shaft designed with an eccentric rotating inside a cylindrical casing and in which the rotor shaft is carried in two needle roller bearings mounted on either side of the eccentric. The invention is especially focused on a device that relieves the loads on the bearings in which the rotor shaft is carried, whose function is to take up axial forces acting on the rotor shaft.

The type of bearing in which the rotor shaft in the type of poker vibrator in question is carried is, as a rule, a needle roller bearing. The reason is that the needle roller bearing has a higher load-bearing capacity for radial forces than a deep-groove ball bearing of equivalent diameter. However, the needle roller bearing cannot take up axial forces, which means that the rotor shaft must also be carried in a bearing that has this capacity, for example a deep-groove ball bearing.

Owing to the radial clearances that always exist in a bearing, whether it be a needle roller bearing or a deep-groove ball bearing, load cases can arise where the deep-groove ball bearing has to take up all of the centrifugal force generated by the rotor shaft. The deep-groove ball bearing must therefore be sized to take up these radial forces as well, which means that the advantage of smaller bearing dimensions provided by the needle roller bearing cannot be exploited.

The purpose of the present invention is to eliminate this disadvantage, and it is particularly characterized by the fact that the deep-groove ball bearing is given a positive clearance in both the radial and axial directions when mounted, whereby the radial clearance is chosen so that it exceeds the radial clearance specified for the needle roller bearing. The positive radial clearance of the deep-groove ball bearing can be brought about either between the outer race of the bearing and the bearing sleeve or between the inner race and the rotor shaft.

Figure 2:
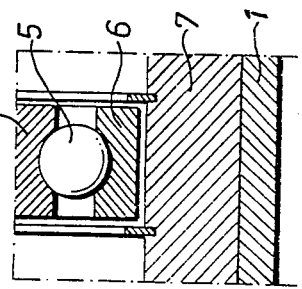

The invention will be described in greater detail below with reference to the appended drawing where FIG. 1 shows a longitudinal section through an electrically powered poker vibrator whose rotor shaft is carried in needle roller bearings and a deep-groove ball bearing, and FIG. 2 shows the rotor shaft's deep-groove ball bearing on a larger scale.

I designates a poker vibrator whose vibration element consists of an eccentrically carried rotor shaft 2. The rotor shaft is driven by an electric motor M encased inside the vibrator 1 and is carried in two needle roller bearings 3 and 4 plus a deep-groove ball bearing 5 mounted at the lower end of the shaft. The needle roller bearings 3 and 4 are mounted at either end of the eccentric portion of the shaft 2, their purpose being to take up the radial forces that arise when the shaft rotates. Through their construction, the needle roller bearings are well suited to take up large radial forces, even when the bearings are of small size. The bearings are not designed to take up axial forces, however. Deep-groove ball bearing 5 is intended to take up such forces.

However, the needle roller bearings exhibit some radial clearance, as a result of which the deep-groove ball bearing 5 can come to be loaded with radial forces arising from the eccentric forces of the rotor shaft. The deep-groove ball bearing is also designed with a certain amount of clearance, and if this is less than the needle roller bearing's clearance, the deep-groove ball bearing 5 may be subjected to the entire eccentric force generated by the rotor shaft. The ball bearing 5 must therefore be sized to take up this load, which means a larger size of the deep-groove ball bearing and thereby of the entire vibrator.

By mounting the deep-groove ball bearing 5 with a positive clearance in the radial direction—which can be provided either between its outer race 6 and the bearing sleeve 7 or between its inner race 8 and the rotor shaft 2—it is possible to eliminate the aforementioned radial load on the bearing entirely, resulting in a considerable reduction in the size of the deep-groove ball bearing 5 and thereby also of the vibrator.

I claim:

1. In a poker vibrator having a cylindrical casing and a rotor shaft with an eccentric rotating inside the casing, a bearing arrangement comprising needle roller bearing means mounted on either side of said eccentric for carrying said rotor shaft and for absorbing radial forces produced by said eccentric, and a deep-groove ball bearing means for taking up solely axial forces on the shaft, said ball bearing means including an inner race disposed about the rotor shaft and an outer race disposed within a bearing sleeve, wherein one of the bearing races is provided with positive radial and axial clearances between it and the respective rotor shaft or bearing sleeve, wherein said positive radial clearance exceeds the radial clearance specified for the needle roller bearing means, such that radial forces are carried solely by said needle roller bearing means.

2. A poker vibrator as defined in claim 1, wherein said positive radial clearance is provided between the outer race and the bearing sleeve.

3. A poker vibrator as defined in claim 1, wherein said positive radial clearance is provided between the inner race and the shaft.

* * * * *

UNITED STATES PATENT AND TRADEMARK OFFICE
CERTIFICATE OF CORRECTION

PATENT NO. : 4,848,936
DATED     : July 18, 1989
INVENTOR(S) : Jean M. Bataille

It is certified that error appears in the above-identified patent and that said Letters Patent is hereby corrected as shown below:

<u>First page, Item 75,</u> "Bataille J. Marie" should read --Jean M. Bataille--;

<u>Item 73,</u> "Dynapac" should read --Dynapac S.A.--;

<u>Item 30,</u> "Jun. 11, 1982 [SE] Sweden   SE 82/00206" should read:
    --June 12, 1981   Sweden   8103706-1--.

<u>First page, 2nd col., 8th line of ABSTRACT,</u> "bearings" should read --bearing--.

Signed and Sealed this

Fifteenth Day of January, 1991

*Attest:*

HARRY F. MANBECK, JR.

*Attesting Officer*       *Commissioner of Patents and Trademarks*